United States Patent [19]
Kato

[11] Patent Number: 5,571,407
[45] Date of Patent: Nov. 5, 1996

[54] HORIZONTAL DRAIN

[75] Inventor: Setsuo Kato, Tokyo, Japan

[73] Assignee: Aluteck Co., Ltd., Tokyo, Japan

[21] Appl. No.: 393,357

[22] Filed: Feb. 23, 1995

[30] Foreign Application Priority Data

Mar. 4, 1994 [JP] Japan ................................. 6-034607

[51] Int. Cl.⁶ .................................................. E03F 5/06
[52] U.S. Cl. ........................................ 210/164; 52/302.1
[58] Field of Search ........................... 52/169.5, 302.1; 4/292, 613, 652; 210/163, 164, 170, 747; 405/36, 52, 127

[56] References Cited

U.S. PATENT DOCUMENTS

| | | | |
|---|---|---|---|
| 2,117,887 | 5/1938 | Holland | 210/163 |
| 3,884,809 | 5/1975 | Logsdon | 210/163 |
| 4,454,039 | 6/1984 | McCoy | 210/164 |

FOREIGN PATENT DOCUMENTS

549535A1  6/1993  European Pat. Off. ............. 52/302.1

*Primary Examiner*—Carl D. Friedman
*Assistant Examiner*—Timothy B. Kang
*Attorney, Agent, or Firm*—Oblon, Spivak, McClelland, Maier & Neustadt, P.C.

[57] ABSTRACT

A horizontal drain includes drain main body having a pan mountable in a recess on a floor, and a drain cover unit having a horizontal cover to cover the pan. The pan has a pipe-like body connected with the pan at a downstream end of the pan in the direction of flow of rainwater. The pipe-like body extends horizontally for connection with a drain pipe and is formed with a drain bore for communication with the pan. The cover has an upper surface provided with a plurality of guide ridges which extend from an outer periphery of the cover toward a lateral center portion of the cover in the direction of flow of rainwater. Each of the guide ridges is inclined such that an upper end of the ridge is positioned away from the pipe-like body. Guide gaps for guiding rainwater into the pan are defined between the adjacent guide ridges.

8 Claims, 10 Drawing Sheets

HORIZONTAL DRAIN

BACKGROUND OF THE INVENTION

1. Field of the Invention

The present invention relates to a horizontal drain.

2. Discussion of the Background

A drain for discharging rainwater is used at scupper on a rooftop or on a veranda on each floor of a building, an apartment, etc. Usually, such drain is a so-called vertical drain which introduces rainwater from above and discharges it downward.

The vertical drain is, however, difficult to install for example on a veranda immediately below which there is a room. In such a case, a so-called horizontal drain is used which introduces and discharges rainwater horizontally.

FIGS. 8 to 10 represent a conventional horizontal drain a, which comprises a drain main body b, a drain casing c and a drain cover d.

The main body b comprises a substantially horizontal pan e and a vertical flange f connected to the pan e and is substantially L-shaped in side view. With the pan e being placed on a floor g of for example a veranda, the flange f is fixed on a wall i through bolts h so that the main body b is attached at a corner defined by the floor g and the wall i. The flange f has a horizontal drain bore j with an internal thread k for threaded engagement with a drain pipe 1 which horizontally penetrates the wall i and which is threaded at its tip end. The pipe 1 is bent at a right angle outside the wall i and extends downward.

The drain casing c comprises a horizontal member m, which is placed on the pan e when installed, a vertical member n abutted with the flange f when installed and side plates o mounted on and interconnecting the members m and n at opposite side ends of the members m and n and is of right-angled triangle in side view. The members m and n define together a large opening p through which rainwater is allowed to flow from the casing c into the main body b. Each of the side plates o has a plurality of guide slots q which extend from the diagonal side of the right-angled triangle toward the members m and n to guide rainwater from outside into the casing c, as shown in FIG. 9.

The drain cover d is flat and is mounted on and along the diagonal side of the casing c. The cover d has a plurality of guide slots r which extend along the diagonal side of the casing c to guide rainwater from outside into the casing c.

Rainwater gathering on the floor g is allowed to pass into the casing c through the slots r and q and is discharged through the opening p, the bore j and the pipe 1 to a drain canal (not shown).

The conventional horizontal drain a as described above has the following disadvantages:

(i) Since rainwater is guided by the guide slots q and r simply cut out on the flat side plates o and cover d, respectively, rainwater gathering in a large quantity may deflect aside, failing to be rapidly guided into the drain a.

(ii) Because of the side plates o and cover d being flat, fallen leaves or the like may cling to them to block the guide slots q and/or r, which hinders smooth guidance of rainwater into the drain a. Small tree branches or the like may happen to stick into the guide slots q and/or r, which narrows in area the guide slots q and/or r and also hinders smooth guidance of rainwater into the drain a.

(iii) People may stumble over the drain casing c which is of right-angled triangle in side view and which protruded out of floor g and the wall i.

(iv) Rainwater may leak owing to the thread engagement at k between the drain pipe 1 and the vertical flange f.

(v) Many component parts are required such as the drain main body b, the drain casing c and the drain cover d, which leads to complications in manufacture and installation.

SUMMARY OF THE INVENTION

It is therefore a primary object of the present invention to provide a horizontal drain which may quickly introduce rainwater even of a large quantity, which has no fear of blockage or narrowing by fallen leaves, small tree branches, etc., which does not cause people to stumble, which allows no rainwater to leak out of the drain and which is reduced in terms of the number of component parts.

According to a first aspect of the invention, a horizontal drain comprises a drain main body having a pan mountable in a recess on a floor, and a drain cover means having a horizontal cover to cover the pan, said pan having a pipe-like body integrally connected therewith at a downstream end of the pan in the direction of flow of rainwater, said pipe-like body extending horizontally for connection with a drain pipe and having a drain bore for communication with the pan, said horizontal cover having an upper surface provided with a plurality of guide ridges which, extend from an outer periphery of the horizontal cover toward a lateral center position of the horizontal cover in the direction of flow of rainwater, each of said guide ridges being inclined such that an upper end of the ridge is away from the pipe-like body, guide gaps for guiding rainwater into the pan being defined between the adjacent guide ridges.

According to a second aspect of the invention, a horizontal drain comprises a drain main body having a pan mountable in a recess on a floor and a vertical flange at a downstream end of the pan in the direction of flow of rainwater and mountable on a wall, and a drain cover means having a horizontal cover to cover the pan and a vertical cover at a downstream end of the horizontal cover and mountable in a spaced-apart relationship with said vertical flange, said pan having a pipe-like body integrally connected therewith at a downstream end of the pan, said pipe-like body extending horizontally for connection with a drain pipe and having a drain bore for communication with the pan, said horizontal cover having an upper surface provided with a plurality of first guide ridges which extend from an outer periphery of the horizontal cover toward lateral center of the horizontal cover in the direction of flow of rainwater, each of said first guide ridges being inclined such that an upper end of the first ridge is away from the pipe-like body, first guide gaps for guiding rainwater into the pan being defined between the adjacent first guide ridges, said vertical cover having a front surface provided with a plurality of second guide ridges which extend from an outer periphery of the vertical cover toward lateral center of the vertical cover in the direction of flow of rainwater, each of said second guide ridges being inclined such that an upper end of the second ridge is at a higher position than a base end of the second ridge, second guide gaps for guiding rainwater into the pan through a gap between the vertical flange and the vertical cover being defined between the adjacent second guide ridges.

The pipe-like body may be stepped so as to have a reduced-diameter portion away from the pan, the drain pipe being fitted over and fixed on the reduced-diameter portion of the pipe.

With the first aspect, rainwater is collected toward the lateral center of the horizontal cover while being guided by the guide ridges on the horizontal cover and is forcibly introduced by inclined sides of the guide ridges into the guide gaps, is sent into the pan and is passed through the drain bore to the drain pipe.

With the second aspect, rainwater running on the floor is collected toward the lateral center of the horizontal cover of the drain cover means while being guided by the first guide ridges on the horizontal cover, is forcibly introduced into the first guide gaps by inclined sides of the first guide ridges and is sent into the pan. Rainwater running down along the wall is collected toward the lateral center portion of the vertical cover of the drain cover means while being guided by the second guide ridges on the vertical cover, is forcibly introduced into the second guide gaps by inclined sides of the second guide ridges and is sent down into the pan through the gap between the vertical flange and the vertical cover. The rainwater flowing into the pan from the horizontal and vertical covers is passed to the drain pipe through the drain bore.

Because the rainwater is being collected toward the lateral center of the drain cover means and is being sent to the drain main body through the guide gaps, the rainwater is drained easily and reliably. Even when fallen leaves, small tree branches or the like cling to the guide ridges, no problems occur in rainwater draining since the guide gaps are neither blocked nor narrowed down. People do not stumble over the drain since the drain does not protruded from the floor and wall. The required number of component parts is reduced and only the drain main body and the drain cover means are needed, which leads to simplification in manufacture and installation.

In the case where the pipe-like body is stepped so as to have a reduced-diameter portion away from the pan and the drain pipe is fitted over and fixed on the reduced-diameter portion of the pipe-like body, there is no fear of rainwater leaking from the connection of the drain pipe with the pipe-like body.

The present invention will become more apparent from the following description of a preferred embodiment thereof in conjunction with the attached drawings.

DESCRIPTION OF THE PREFERRED EMBODIMENT

In this specification, the terms "upstream" and "downstream" are used in connection with direction D of the flow of rainwater.

FIGS. 1 to 7 represent an embodiment of the present invention in which a horizontal drain 1 comprises a drain main body 2 and a drain cover means 10.

Figure 2:
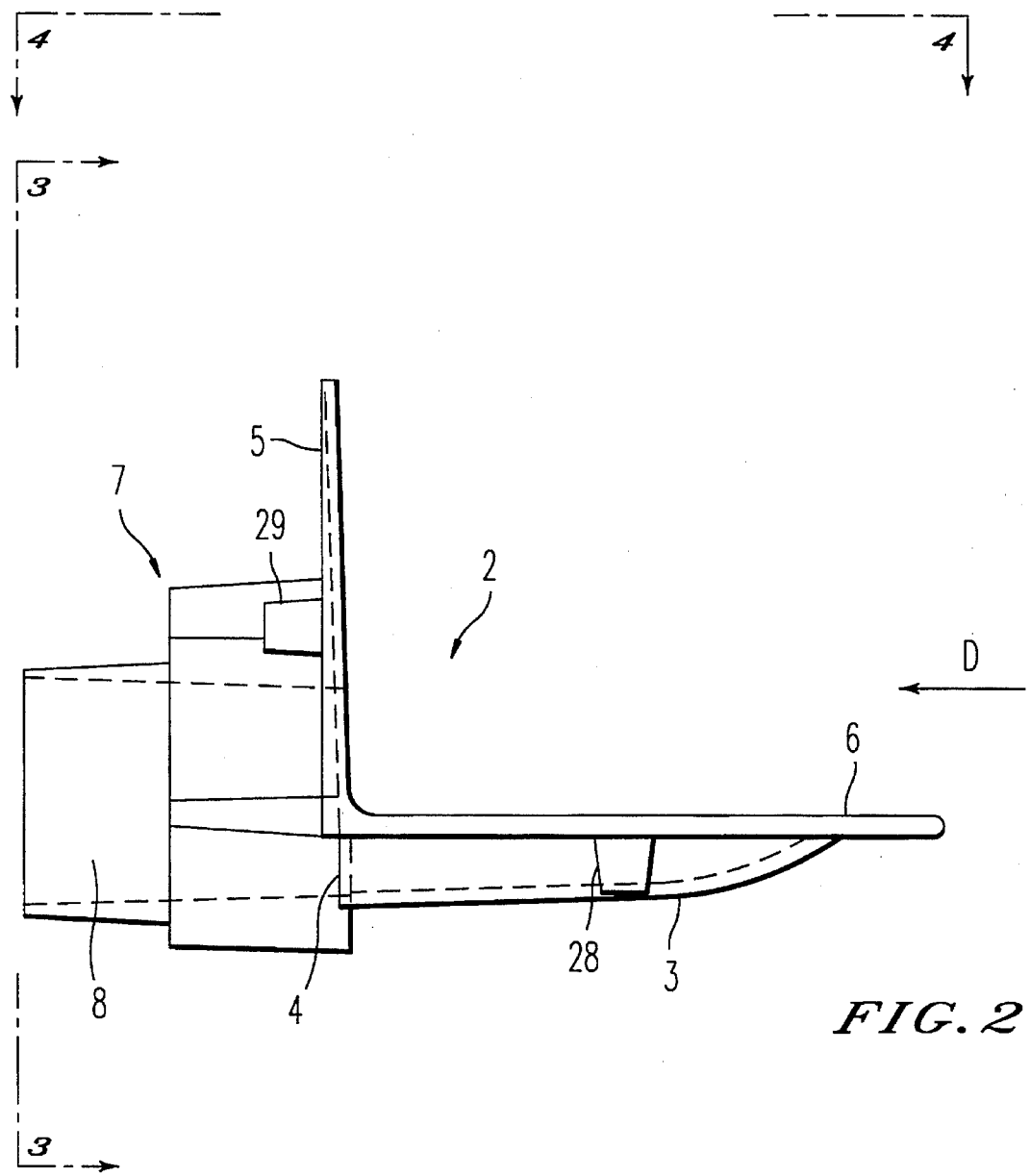
FIG. 2 is a side view of a drain main body used for the horizontal drain according to the present invention.
Figure 3:
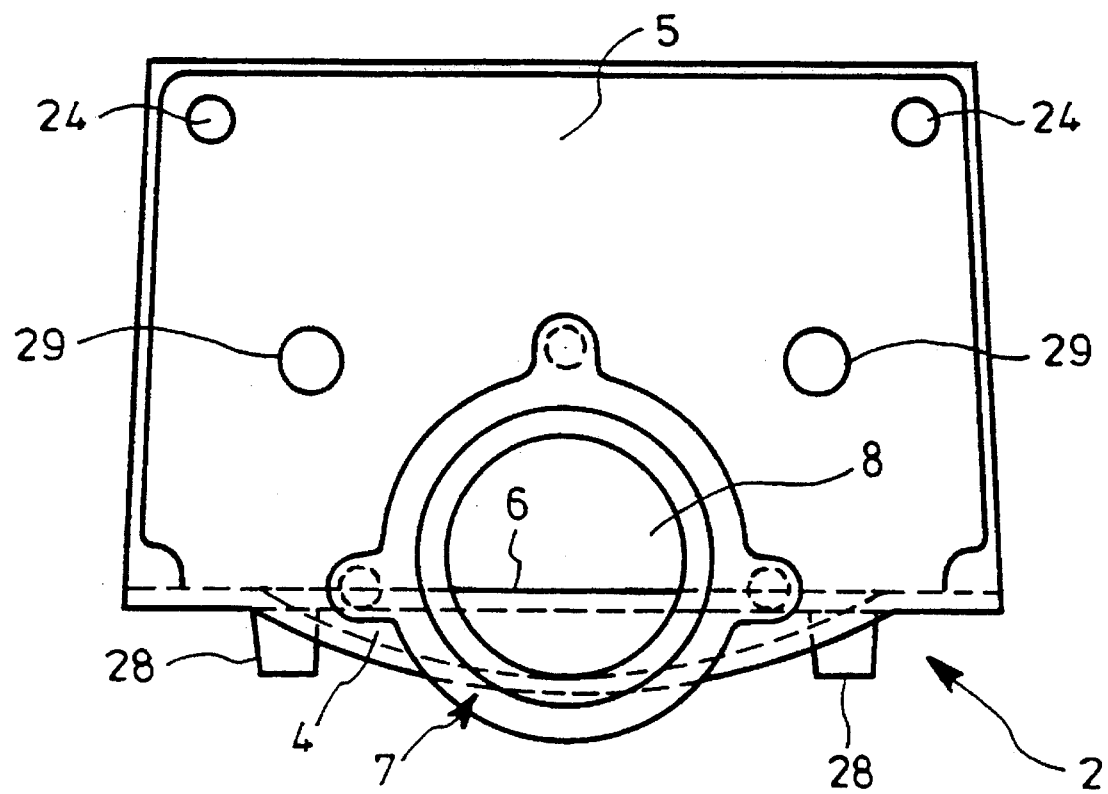
FIG. 3 is a view looking in the direction of arrows 3—3 in FIG. 2.
Figure 4:
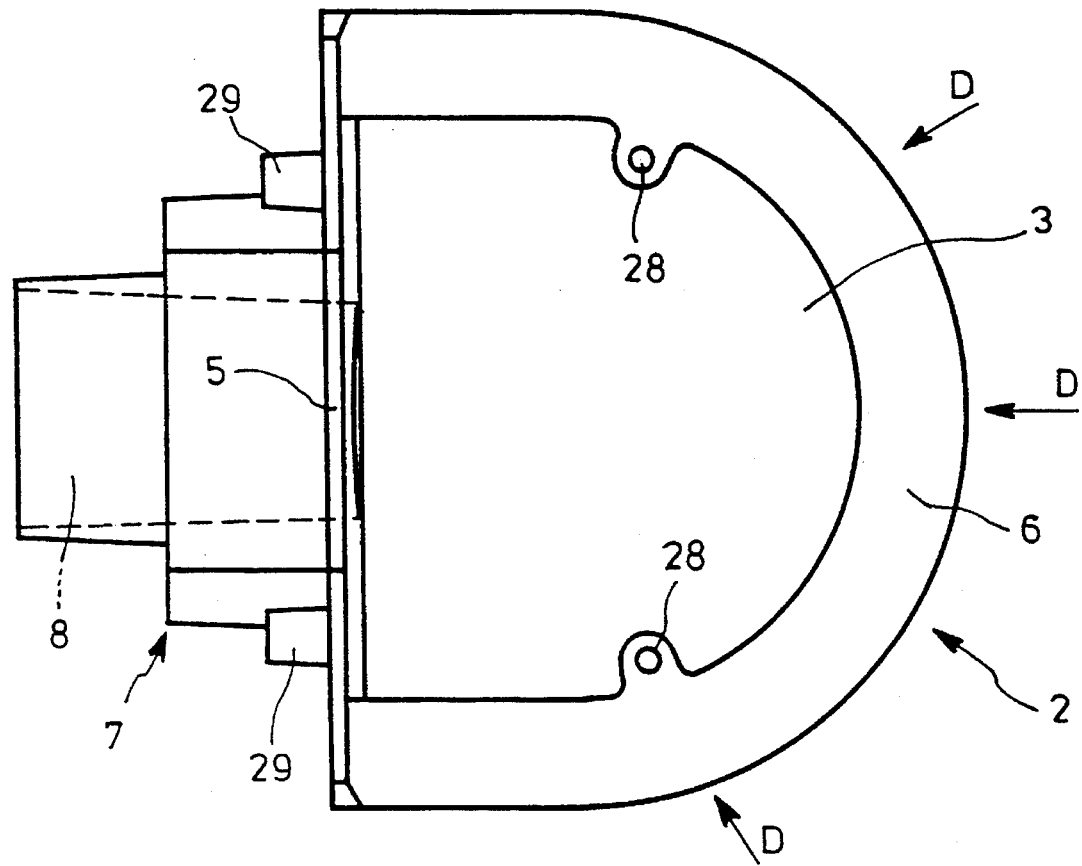
FIG. 4 is a view looking in the direction of arrows 4—4 in FIG. 2.

As shown in FIGS. 2 to 4, the main body 2 has a substantially horizontal pan 3 and a vertical flange 5 and is substantially L-shaped in side view. The pan 3 is arcuate at its upstream end as best shown in FIG. 4 and has a vertical edge 4 at its downstream end where the pan 3 is connected with the vertical flange 5. The pan 3 has at its outer periphery a horizontal flange 6 which extends downstream to and is integrally connected with the vertical flange 5.

Figure 1:
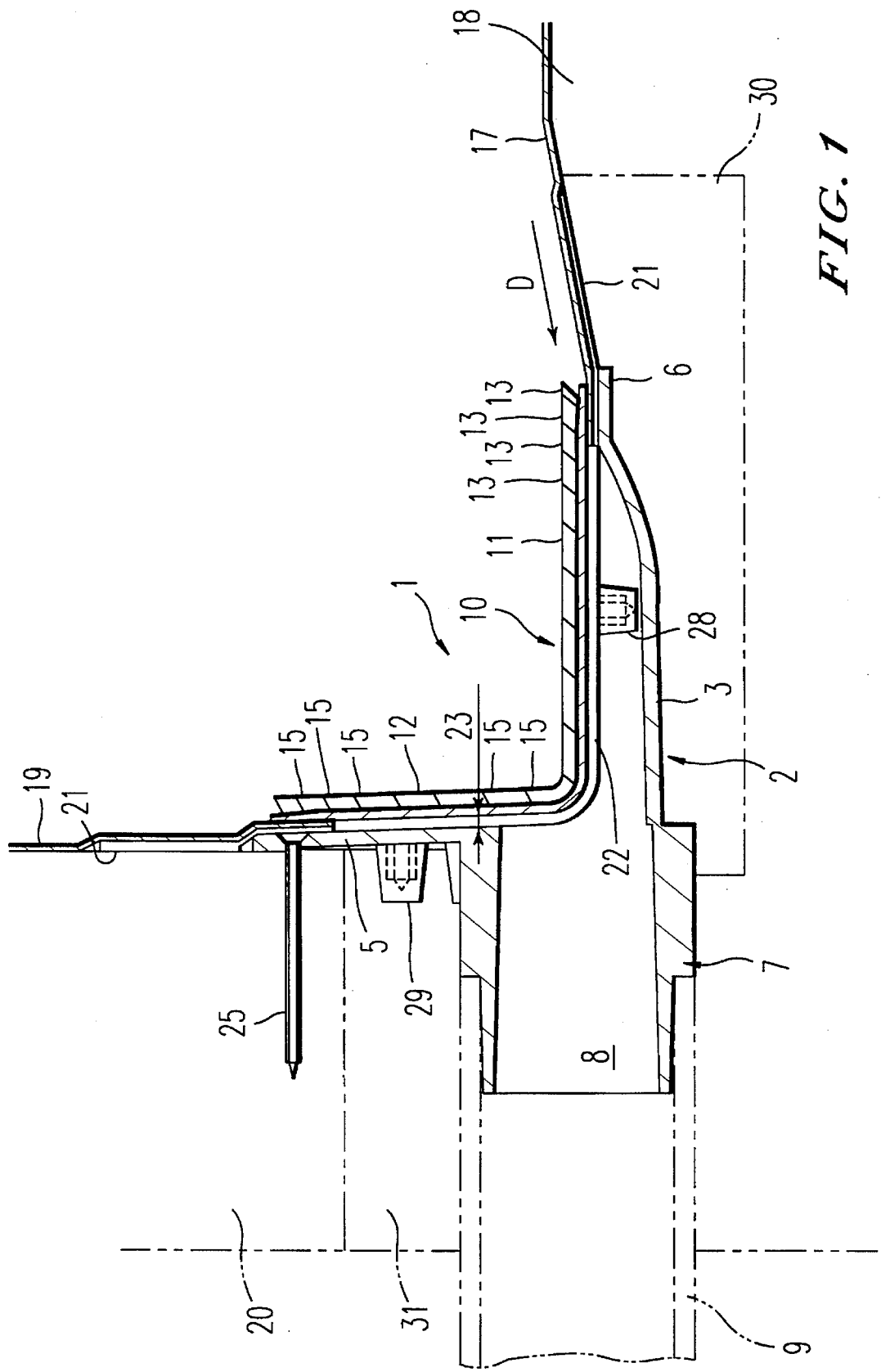
FIG. 1 is a vertical longitudinal sectional view of an embodiment of a horizontal drain according to the present invention.

When viewed from side as shown in FIGS. 1 and 2, the pan 3 is shallowest at its upstream end and becomes gradually deeper toward its downstream end. Laterally, as shown in FIG. 3, the pan 3 is deepest at its lateral center and becomes gradually shallower toward its opposite lateral edges.

A horizontal short pipe-like body 7 is integrally connected with and bridges over the flange 5 and the edge 4 of the pan 3 and is protruded downstream. The pipe-like body 7 is formed with a drain bore 8 which is directed horizontally and is divergent in the direction D of flow of rainwater, so that the inner bottom of the pipe-like body 7 is descendent in the direction D of flow of rainwater. At the upstream end of the pipe-like body 7, a lowest point of the bore 8 is substantially coplanar with the deepest portion of the pan 3 for communication with the pan 3. The pipe-like body 7 is stepped at its outer periphery to provide a reduced-diameter downstream portion over and to which a drain pipe 9 made of for example metal or resin such as vinyl chloride is fitted and attached using adhesive.

Figure 5:
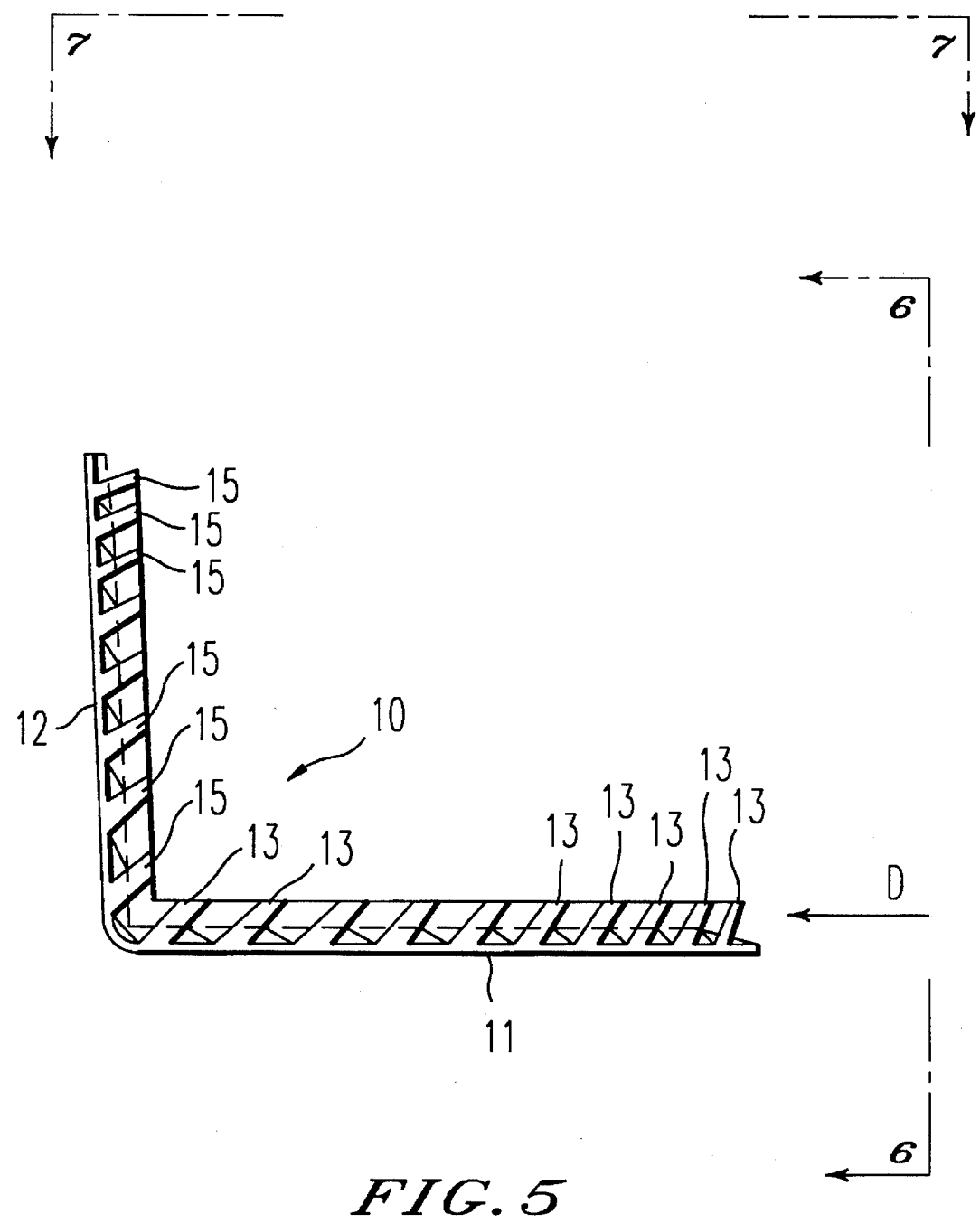
FIG. 5 is a side view of a drain cover used for the horizontal drain according to the present invention.
Figure 6:
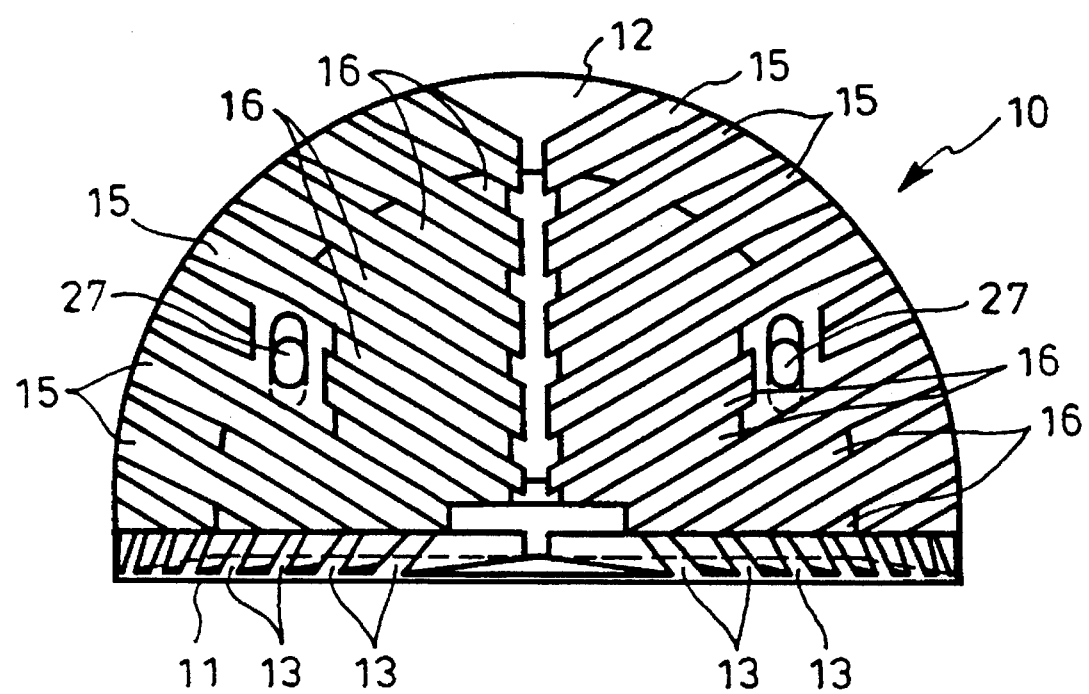
FIG. 6 is a view looking in the direction 6—6 in FIG. 5.
Figure 7:
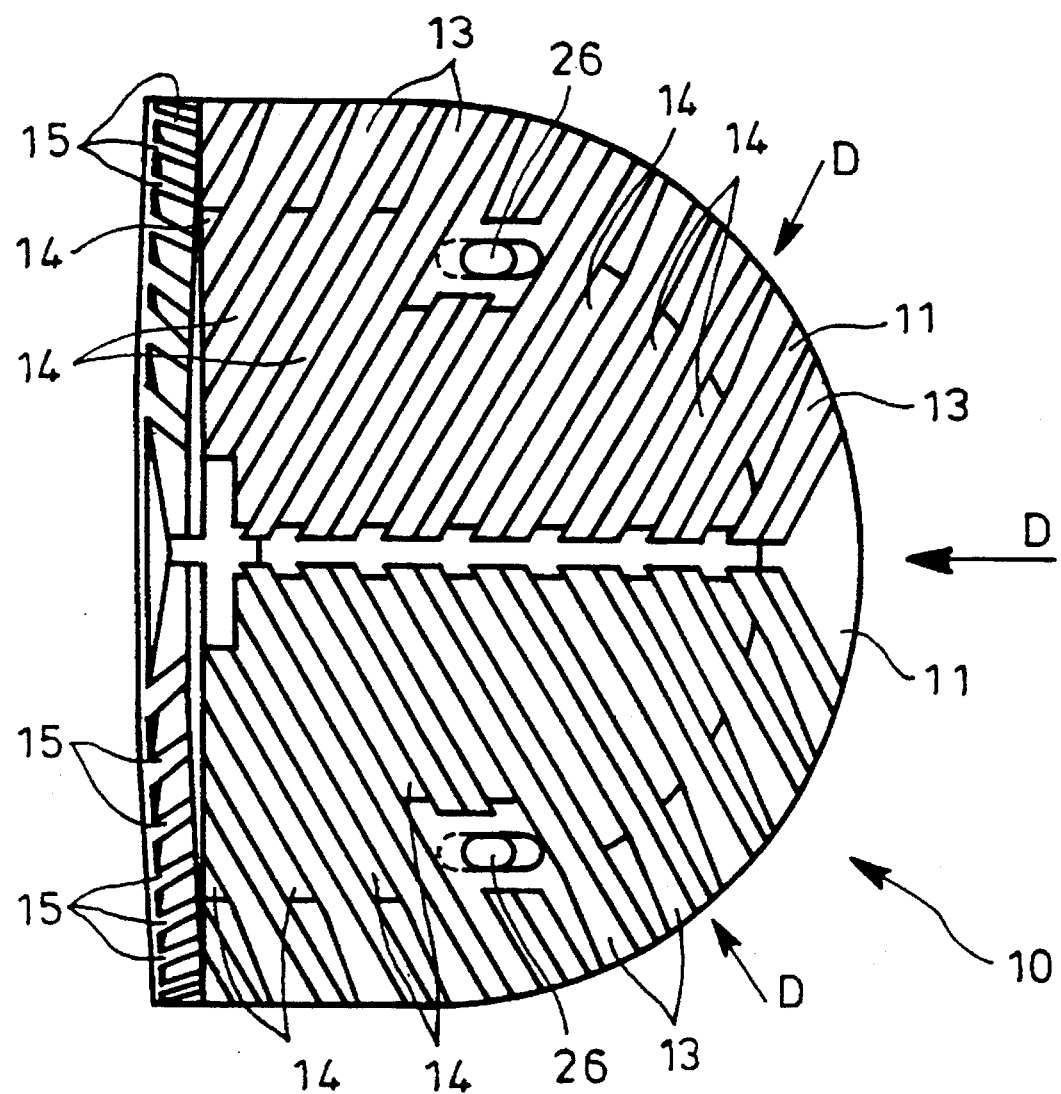
FIG. 7 is a view looking in the direction 7—7 in FIG. 5.
Figure 8:
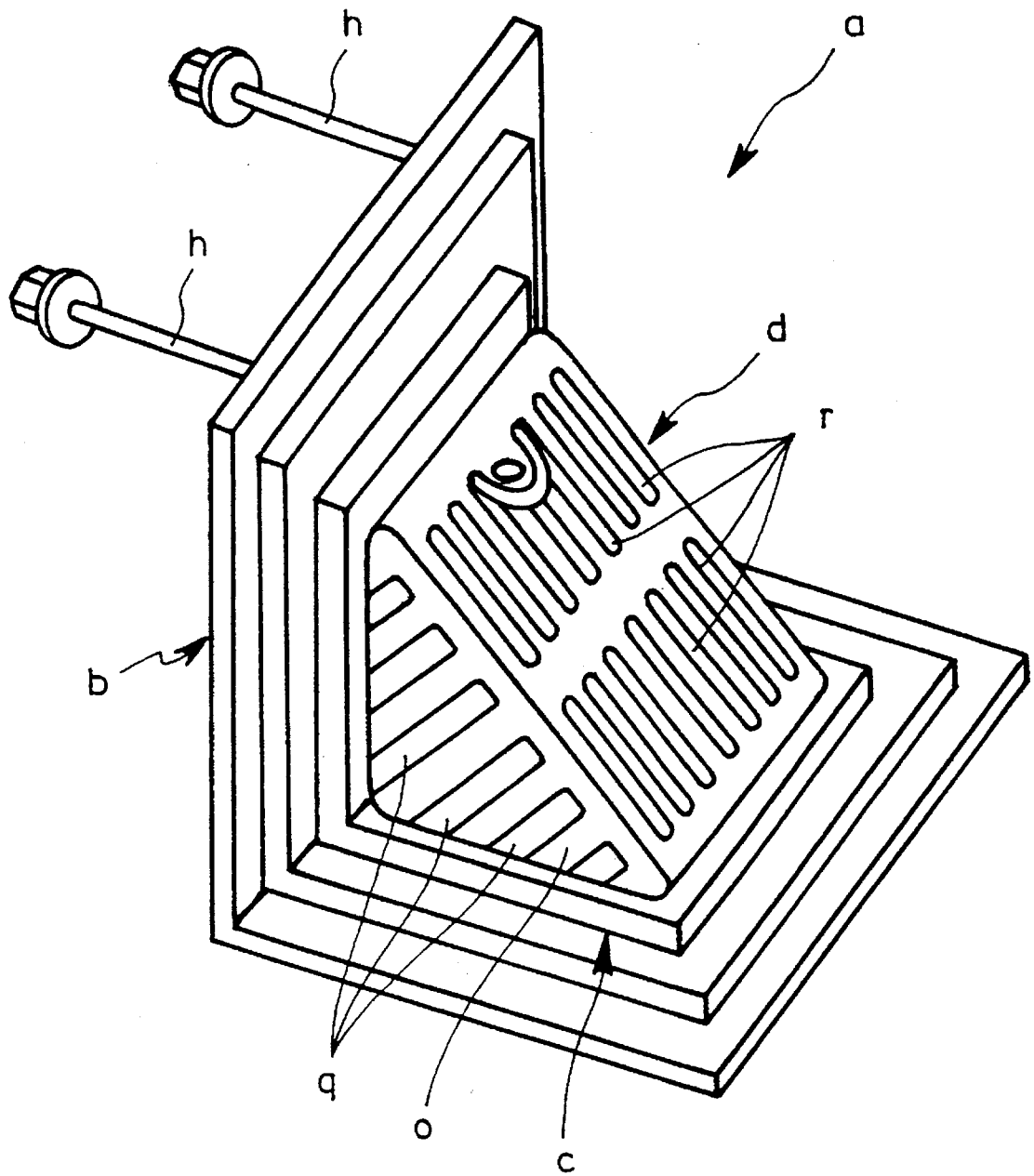
FIG. 8 is a perspective view of a conventional horizontal drain.
Figure 9:
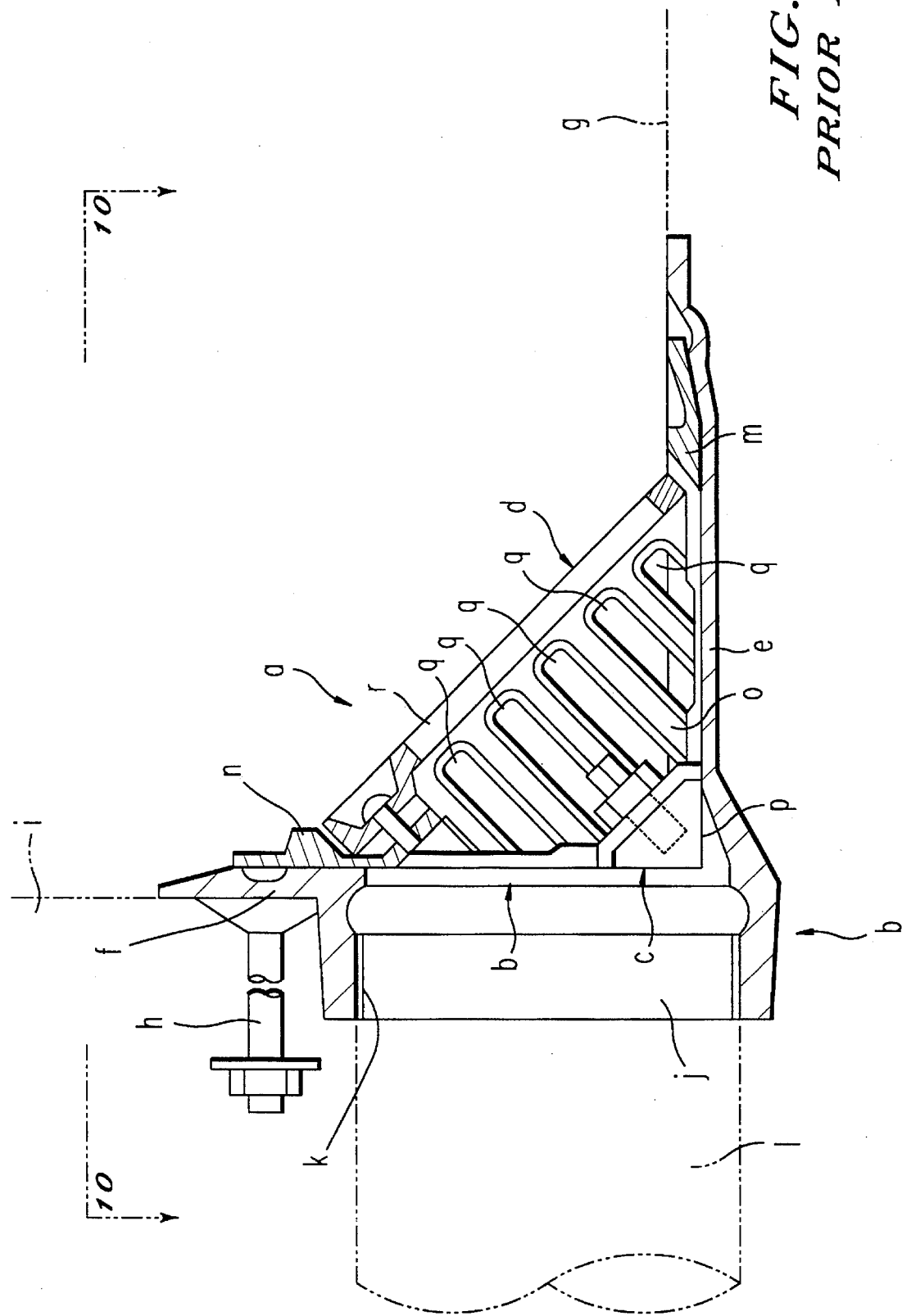
FIG. 9 is a vertical longitudinal sectional view of the horizontal drain in FIG. 8.
Figure 10:
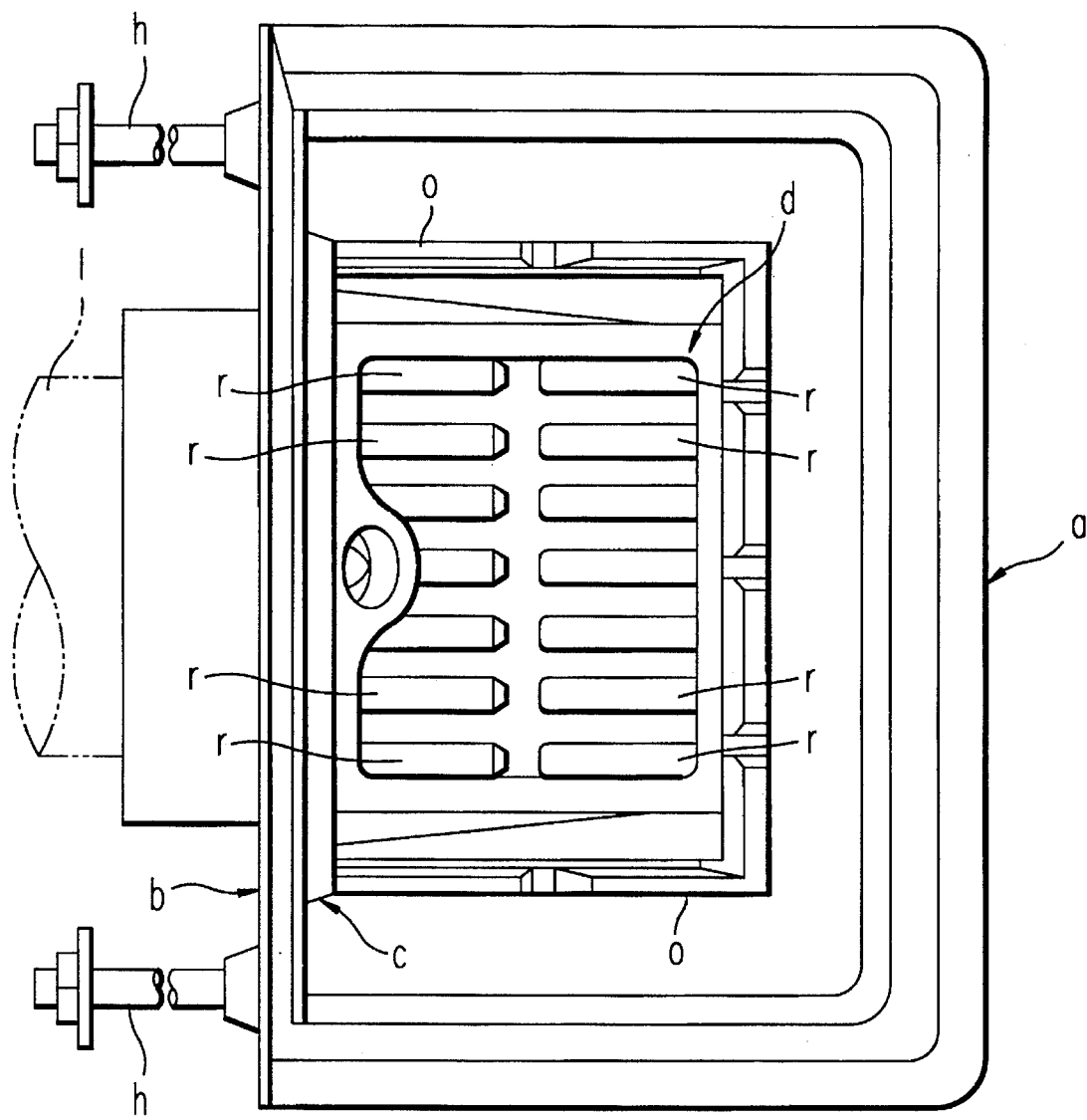
FIG. 10 is a view looking in the direction 10—10 in FIG. 9.

As shown in FIGS. 5 to 7, the drain cover means 10 comprises a generally flat, horizontal cover 11 and a generally flat, vertical cover 12 which has an arcuate upper end and is connected at its lower end with an downstream end of the cover 11 so that the cover means 10 is substantially L-shaped in side view. As best shown in FIG. 7, the cover 11 is arcuate at its upstream end and has an upper surface provided with a plurality of spaced guide ridges 13 each extending from an arcuate outer periphery of the cover 11 toward lateral center of the cover 11 with an inner end of the ridge 13 at the lateral center of the cover 11 being downstream of its outer end at the outer periphery of the cover 11, that is, the ridges 13 descending in the direction D of flow of rainwater flowing on the lateral center of the cover 11. Each of the guide ridges 13 is inclined such that its upper or tip ends are positioned further away from the pipe-like body 7 than its lower or base ends as shown in FIG. 5. Guide gaps 14 are respectively defined between the adjacent guide ridges 13 for passing of rainwater through the cover 11.

As shown in FIG. 6, the vertical cover 12 has a front surface provided with a plurality of spaced guide ridges 15 each extending from an arcuate periphery of the cover 12 toward a lateral center portion of the cover 12 with an inner end of the ridge 15 at the lateral center of the cover 12 being downstream of its outer end at the outer periphery of the cover 12, that is, the ridges 15 being descent toward the lateral center of the cover 12. Each of the guide ridges 15 is inclined such that its tip or outer end is at higher position than its base end as shown in FIG. 5. Guide gaps 16 are respectively defined between the adjacent guide ridges 15 for passing of rainwater through the cover 12.

In the Figures, reference numeral 17 represents a waterproof sheet attached to a floor 18 using adhesive; 19 is a waterproof sheet attached to a wall 20 using adhesive; and 21 is a reinforcing sheet attached to the flanges 5 and 6. The reinforcing sheet 21 is formed with an opening 22 with its inner peripheral edge running along outer peripheral edges of the guide gaps 14 on the horizontal cover 11 and also running along outer peripheral edges of the guide gaps 16 on the vertical cover 12. With the horizontal drain 1 is set in position, a gap 23 corresponding to thickness of the reinforcing sheet 21 is formed between the flange 5 and the cover 12.

Reference numeral 24 denotes holes or counter sunken portions each for a countersunk head screw horizontally penetrating the vertical flange 5; 25 denotes countersunk head screws each inserted into the corresponding hole or countersink 24 to fix the main body 2 on the wall 20: 26 designates slots each for a roundhead screw vertically penetrating the horizontal cover 11. The invention also includes slots 27 each for a roundhead screw horizontally penetrating the vertical cover 12, tapping seats 28 on the pan 3 each directed vertically so as to fix the horizontal cover 11 on the horizontal flange 6 by screwing the roundhead screws having penetrated the corresponding slots 26, tapping seats 29 on the vertical flange 5 each directed horizontally so as to fix the vertical cover 12 on the vertical flange 5 by screwing the roundhead screws having penetrated the corresponding slots 27, a recess 30 on the floor 18 adjacent to the wall 20 for receiving the main body 2 and, a horizontal hollow 31 of the wall 20 for penetration of the drain pipe 9.

When the horizontal drain 1 is to be set on the floor 18, for example, the pipe-like body 7 is inserted into the wall 20 through the horizontal hollow 31 and the pan 3 is placed in the recess 30. Then, the drain pipe 9 is fitted over and fixed on the reduced-diameter portion of the pipe-like body 7, the countersunk head screws 25 are screwed into the holes 24 of the vertical flange 5 to fix the main body 2 on the wall 20 and mortar is filled in the recess 30 and the hollow 31.

Next, the reinforcing sheet 21 is positioned for alignment of its opening 22 with the horizontal and vertical flanges 6 and 5 and is attached at its inner peripheral edge, which defines the opening 22, to the flanges 5 and 6 using adhesive. Further, the sheet 21 is attached at its outer peripheral edge to the floor 18 and wall 20 using adhesive. Then, attached to the sheet 21 using adhesive are the waterproof sheets 17 and 19 which have been attached to the floor 18 and wall 20 using adhesive, respectively. In this case, the sheets 17 and 19 are preliminarily cut out to define in unison an opening which is in alignment with the opening 22 of the sheet 21.

After the main body 2 is set in position, the drain cover means 10 is placed on the main body 2 with its horizontal cover 11 covering the pan 3 and the vertical cover 12 abutting on the vertical flange 5. Screws are inserted into the slots 26 and 27 on the horizontal and vertical covers 11 and 12, respectively, and are screwed into the tapping seats 28 and 29, respectively, to set the drain cover means 10 in position on the main body 2 where the upper surface of the horizontal cover 11 is slightly lower than an upper surface of the floor 18.

Rainwater running over the waterproof sheet 17 of the floor 18 is collected while guided by the guide ridges 13 of the horizontal cover 11 toward the lateral center of the cover 11. It is forcibly introduced into the guide gaps 14 by inclined sides of the guide ridges 13 and is sent to the pan 3. Rainwater running down along the waterproof sheet 19 on the wall 20 is collected toward the lateral center of the cover 12 while guided by the guide ridges 15 on the vertical cover 12. It is forcibly introduced into the guide gaps 16 the by inclined sides of the guide ridges 15 and is sent down through the gap 23 to the pan 3. Rainwater thus introduced into the pan 3 is sent through the drain bore 8 to the drain pipe 9 and is discharged to the drain canal (not shown).

In this embodiment, rainwater is guided by the guide ridges 13 and 15 and is collected toward the lateral center of the drain cover means 10. It is forcibly introduced into the guide gaps 14 and 16 by the inclined sides of the guide ridges 13 and 15. Thus, rainwater can be easily and quickly introduced into the drain main body 2. Even when rainwater is of a large quantity, it is not gathered on the floor 18 and the performance of the drain is very satisfactory.

Since the guide gaps 14 and 16 are provided between the adjacent guide ridges 13 and 15, respectively, and receive rainwater from above and the sides, the guide gaps 14 and 16 cannot be blocked nor narrowed down by any fallen leaves or small tree branches. As a result, rainwater can be always drained in smooth manner.

Further, since the drain main body 2 or the drain cover means 10 do not protruded from the floor 18 and wall 20, there is no fear that people stumble over the drain and safety is ensured.

Also, since the drain pipe 9 is fitted over and fixed on the reduced-diameter portion of the pipe-like body 7, rainwater running into the drain pipe 9 through the drain bore 8 does not leak from the drain pipe 9.

The required component parts are the drain main body 2 and the drain cover means 10 and are reduced in number in comparison with the prior art, which contributes to simplification in manufacture and installation.

Attached below the waterproof sheets 17 and 19 is the reinforcing sheet 21 which peripherally surrounds the horizontal and vertical flanges 6 and 5 of the main body 2. Therefore, rainwater does not permeate between the waterproof sheet 17 and the floor 18 and between the waterproof sheet 19 and the wall 20 and the waterproof sheets 17 and 19 are protected from being damaged.

It is to be understood that the present invention is not limited to the above-mentioned embodiment and that various modifications may be made without departing from the spirit and scope of the present invention. For example, though the description has been made of the case where the drain main body and the drain cover means are substantially L-shape in side view, a flat drain main body and a flat drain cover means may be used which has no vertical flange and no vertical cover.

With the horizontal drain of the present invention according to claims 1 and 2, the following effects are obtained:

(I) Even if rainwater is of a large quantity, water can be easily and quickly drained.

(II) Even if any fallen leaves, small tree branches or the like cling to the drain cover, the guide gaps are neither blocked nor narrowed down and rainwater can be always drained in a reliable manner.

(III) Since the drain main body and the drain cover means do not protrude from the floor surface and wall, there is no fear that people will stumble over the drain and safety.

(IV) Only a reduced number of component parts are required, which contributes to simplification in manufacture and installation.

In addition to the above-mentioned effects, the invention also provides an effect that there is no fear that the rainwater leaks from the connection of the drain pipe with the pipe-like body of the pan.

What is claimed is:

1. A horizontal drain, comprising:

a drain main body having a pan mountable in a recess on a floor, and a drain cover means having a horizontal cover for covering the pan, said pan having a pipe-like body integrally connected therewith at a downstream end of the pan in the direction of flow of rainwater, said pipe-like body extending horizontally, connecting with a drain pipe and additionally having a drain bore communicating with the pan, said horizontal cover having an upper surface provided with a plurality of guide ridges which extend from an outer periphery of the horizontal cover toward a lateral center portion of the horizontal cover in the direction of flow of rainwater, each of said guide ridges being inclined such that an upper end of each of said ridges is positioned further away from the pipe-like body than a lower end thereof, wherein a plurality of guide gaps guiding rainwater into the pan are respectively located between the adjacent guide ridges.

2. A horizontal drain, comprising:

a drain main body having a pan mountable in a recess on a floor and a vertical flange located at a downstream end of the pan in the direction of flow of rainwater and mountable on a wall, and a drain cover means having a horizontal cover covering the pan and a vertical cover located at a downstream end of the horizontal cover and mounted in a spaced-apart relationship with said vertical flange, said pan having a pipe-like body integrally connected therewith at a downstream end of the pan, said pipe-like body extending horizontally, connecting with a drain pipe and additionally having a drain bore communicating with the pan, said horizontal cover having an upper surface provided with a plurality of first guide ridges which extend from an outer periphery of the horizontal cover toward a lateral center portion of the horizontal cover in the direction of flow of rainwater, each of said first guide ridges being inclined such that an upper end of each of the first guide ridges is positioned further away from the pipe-like body than a lower end thereof, a plurality of first guide gaps guiding rainwater into the pan being defined between the adjacent first guide ridges, said vertical cover having a front surface provided with a plurality of second guide ridges which extend from an outer periphery of the vertical cover toward a lateral center portion of the vertical cover in the direction of flow of rainwater, each of said second guide ridges being inclined such that an upper end thereof is at higher position than a base end thereof, and wherein second guide gaps guiding rainwater into the pan through a gap between the vertical flange and the vertical cover are respectively defined between the adjacent second guide ridges.

3. The horizontal drain according to claim 1 wherein the pipe-like body is stepped at its outer periphery to have a reduced-diameter portion away from the pan, the drain pipe being fitted over and fixed on the reduced-diameter portion of the pipe-like body.

4. The horizontal drain according to claim 2 wherein the pipe-like body is stepped at its outer periphery to have a reduced-diameter portion away from the pan, the drain pipe being fitted over and fixed on the reduced-diameter portion of the pipe-like body.

5. A horizontal drain, comprising:

a drain main body having a pan mountable in a recess on a floor, and a drain cover having a horizontal cover covering the pan, said pan having a pipe-like body integrally connected therewith at a downstream end of the pan in the direction of flow of rainwater, said pipe-like body extending horizontally, connecting with a drain pipe and additionally having a drain bore communicating with the pan, said horizontal cover having an upper surface provided with a plurality of guide ridges which extend from an outer periphery of the horizontal cover toward a lateral center portion of the horizontal cover in the direction of flow of rainwater, each of said guide ridges being inclined such that an upper end of each of said ridges is positioned further away from the pipe-like body than a lower end thereof, wherein a plurality of guide gaps guiding rainwater into the pan are respectively located between the adjacent guide ridges.

6. A horizontal drain, comprising:

a drain main body having a pan mountable in a recess on a floor and a vertical flange located at a downstream end of the pan in the direction of flow of rainwater and mountable on a wall, and a drain cover having a horizontal cover covering the pan and a vertical cover located at a downstream end of the horizontal cover and mounted in a spaced-apart relationship with said vertical flange, said pan having a pipe-like body integrally connected therewith at a downstream end of the pan, said pipe-like body extending horizontally, connecting with a drain pipe and additionally having a drain bore communicating with the pan, said horizontal cover having an upper surface provided with a plurality of first guide ridges which extend from an outer periphery of the horizontal cover toward a lateral center portion of the horizontal cover in the direction of flow of rainwater, each of said first guide ridges being inclined such that an upper end of each of the first guide ridges is positioned further away from the pipe-like body than a lower end thereof, a plurality of first guide gaps guiding rainwater into the pan being defined between the adjacent first guide ridges, said vertical cover having a front surface provided with a plurality of second guide ridges which extend from an outer periphery of the vertical cover toward a lateral center portion of the vertical cover in the direction of flow of rainwater, each of said second guide ridges being inclined such that an upper end thereof is at higher position than a base end thereof, and wherein second guide gaps guiding rainwater into the pan through a gap between the vertical flange and the vertical cover are respectively defined between the adjacent second guide ridges.

7. The horizontal drain according to claim 5 wherein the pipe-like body is stepped at its outer periphery to have a reduced-diameter portion away from the pan, the drain pipe being fitted over and fixed on the reduced-diameter portion of the pipe-like body.

8. The horizontal drain according to claim 6 wherein the pipe-like body is stepped at its outer periphery to have a reduced-diameter portion away from the pan, the drain pipe being fitted over and fixed on the reduced-diameter portion of the pipe-like body.

* * * * *